(12) United States Patent
Wang et al.

(10) Patent No.: US 7,027,694 B2
(45) Date of Patent: Apr. 11, 2006

(54) ALIGNMENT ASSEMBLY AND METHOD FOR AN OPTICS MODULE

(75) Inventors: Tak Kui Wang, Saratoga, CA (US); Storrs T. Hoen, Brisbane, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 167 days.

(21) Appl. No.: 10/718,207

(22) Filed: Nov. 20, 2003

(65) Prior Publication Data

US 2005/0111794 A1    May 26, 2005

(51) Int. Cl.
  *G02B 6/26* (2006.01)
(52) U.S. Cl. .............................. 385/52; 385/33; 385/93
(58) Field of Classification Search ................ 385/52, 385/31, 33, 90, 91, 93
  See application file for complete search history.

(56) References Cited

U.S. PATENT DOCUMENTS

| 4,357,072 A | * | 11/1982 | Goodfellow et al. ......... 385/91 |
| 5,388,171 A | | 2/1995 | Michikoshi et al. |
| 5,499,312 A | * | 3/1996 | Hahn et al. .................... 385/91 |
| 6,253,010 B1 | | 6/2001 | Belser et al. |
| 6,541,892 B1 | | 4/2003 | Hoen |
| 6,625,101 B1 | | 9/2003 | Jerman et al. |
| 6,626,585 B1 | * | 9/2003 | Malone ........................ 385/88 |
| 6,863,452 B1 | * | 3/2005 | Takada ........................ 385/93 |
| 2002/0071642 A1 | * | 6/2002 | Nakata ........................ 385/88 |
| 2004/0052468 A1 | * | 3/2004 | Pham et al. .................. 385/52 |
| 2004/0114882 A1 | * | 6/2004 | Marquez et al. ............. 385/91 |
| 2005/0175298 A1 | * | 8/2005 | Matta et al. .................. 385/93 |

* cited by examiner

*Primary Examiner*—Sung Pak

(57) ABSTRACT

An alignment assembly for an optics module includes an alignment stage that is enabled to provide an adjustment of the relative positioning of a light beam and a lens, but also includes a locking mechanism which disables the movement of the alignment stage following a one-time alignment procedure. The locking mechanism may include one or more heaters and meltable material which is heated during the one-time alignment procedure and cooled when the target relative position between the beam and the lens is achieved.

20 Claims, 7 Drawing Sheets

ALIGNMENT ASSEMBLY AND METHOD FOR AN OPTICS MODULE

BACKGROUND ART

Small-scale systems are used in optical applications to efficiently couple components. For example, an optics module may be designed to efficiently couple a light source, such as a laser, to an optical fiber. The module may include one or more lenses that promote the efficient coupling. FIG. 1 is an example of an optical module 10 in which a beam from a light source 12 is focused onto a fiber 14 by a lens 16. As one possibility, the light source may be formed by a succession of thin films on a semiconductor substrate 18 so as to define a Vertical Cavity Surface Emitting Laser (VCSEL). In addition to the semiconductor substrate, the enclosure of the optics module may include a lid 20 and a pair of supports 22 and 24.

Often, the light source 12 is prefabricated for attachment to the structure that is used to maintain the position of the fiber 14. Thus, while some of the components of the optics module 10 may be integrally formed, other components are subsequently attached using mechanical techniques. One concern is that the light beam will not be precisely aimed at the optical fiber, even if exacting tolerances are imposed upon the fabrication and attachment techniques. Thus, there is an advantage to mounting at least one of the components of the optics module so as to allow lateral movement relative to the other components. Then, the coupling efficiency can be maximized on a module-by-module basis.

What is needed is an alignment assembly and method for an optics module, where the alignment assembly is able to maintain a one-time adjustment of the relative position of a light beam and a lens.

SUMMARY OF THE INVENTION

An alignment assembly for an optics module having a light source and a lens includes an alignment stage that is coupled to enable adjustment of the relative positioning of the light source and the lens, but also includes a locking mechanism which disables movement of the alignment stage after a target relative position is achieved. Thus, where the alignment stage is displaced in response to actuator forces, the locking mechanism is used to render the alignment stage unresponsive to those forces.

The locking mechanism may include a meltable material that is solidified after the alignment stage has been properly aligned and brought into contact with the material. The alignment may be manipulation in X and Y axes, with the alignment stage being moved in the Z axis upon the determination that the target relative position of the light source and the lens has been achieved. One acceptable material is a gold/tin alloy, since the alloy has a desirable melting temperature and has "mechanical" properties to securely lock the alignment stage in position following a one-time alignment procedure.

A method of fabricating the alignment assembly for the optics module includes forming a number of patterned layers on one or more substrates so as to define the cooperative arrangement of the alignment stage, the meltable material, and the heat source that selectively melts the material. As one possibility, all of the layers may be formed on a single substrate. Either the light source or the lens may be mounted to the alignment stage for movement therewith. Alternatively, the light source or the lens may also be integrally formed on the alignment stage by the patterning of layers. For example, a VCSEL may be fabricated on the alignment stage itself or upon a second substrate that is connected to the substrate on which the alignment stage is fabricated.

To ensure that the alignment stage is immobilized following the alignment procedure, the locking mechanism may include an ability to permanently disable the structure which originally allows movement of the alignment stage. For example, if the alignment stage includes support members that are flexed by the application of actuator signals, one or more support members may be intentionally disabled to ensure that the stage is locked down. Thus, the support member may be designed as a fusible link which can be disconnected by introducing a current pulse after alignment is achieved.

The method of providing optical alignment within an optics module includes applying the actuator signals to laterally displace the alignment stage which controls the relative lateral position of a beam axis to a lens. When the desired relative lateral position is achieved, such as when the optical coupling from the light source to an optical fiber is maximized, the alignment stage is shifted in a direction that does not disturb the lateral positioning, so as to contact the locking mechanism (e.g., the meltable material). The alignment stage may be "snapped" in a Z axis direction, while the positioning within the X and Y axes is maintained. The cooling of the meltable material fixes the alignment stage to maintain the target relative lateral position. Where the disabling feature is included, the ability of the alignment stage to move laterally is permanently disabled.

DETAILED DESCRIPTION

Figure 2:
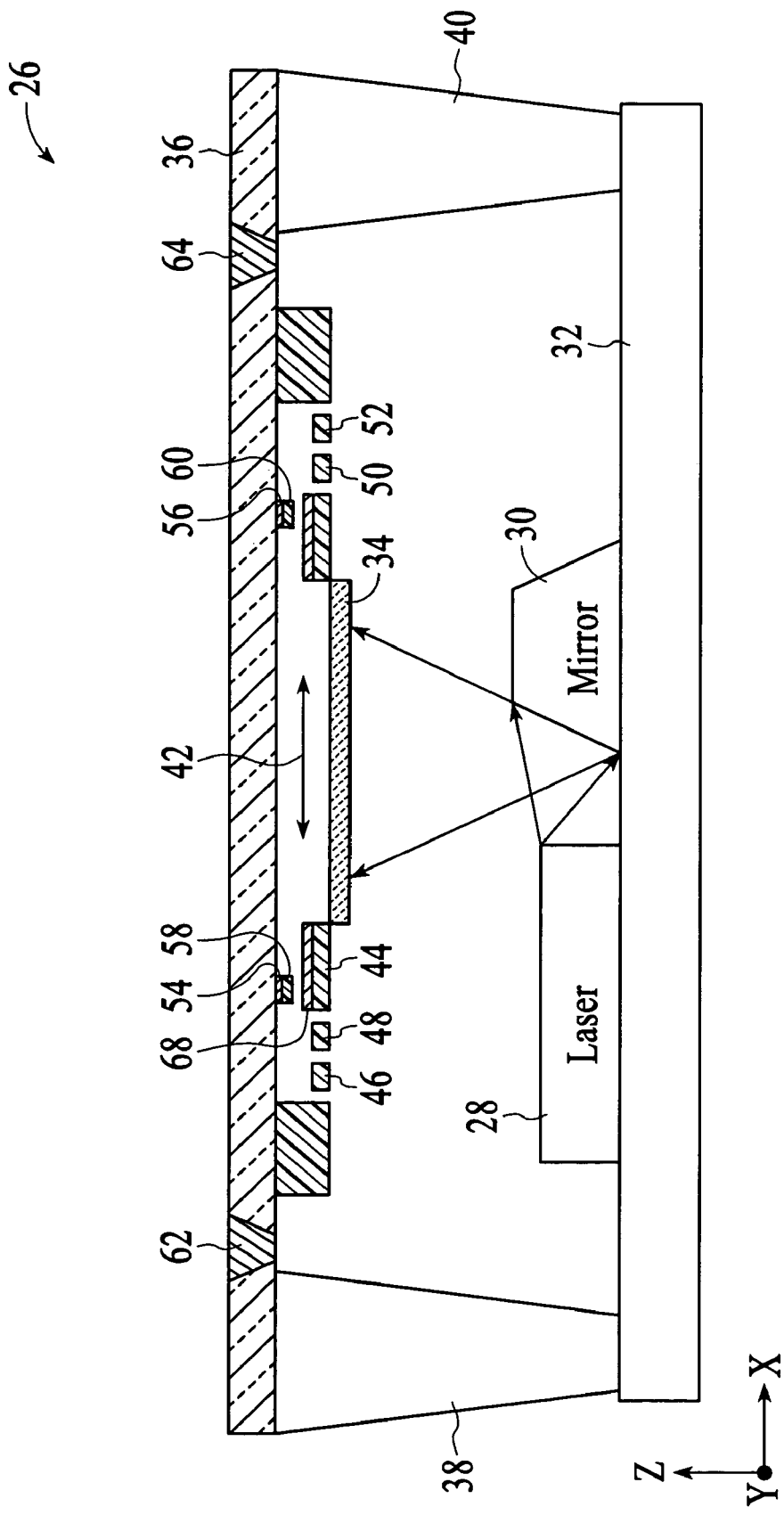
FIG. 2 is a side sectional view of an optics module having a one-time alignment capability in accordance with the invention.

With reference to FIG. 2, an example of an optics module 26 that utilizes the invention is shown as including a laser 28 and a mirror 30. The laser and the mirror are attached to a submount 32, such as a rigid substrate. Optionally, the submount is a semiconductor substrate on which the laser and mirror are fabricated using integrated circuit fabrication techniques. For example, the laser may be an edge emitter laser that projects light toward the mirror or directly to a lens 34. In a situation in which a VCSEL is used to project light directly toward the lens, the mirror may be excluded.

A lid 36 is properly spaced from the submount 32 by supports 38 and 40. The lid 36, submount 32 and supports may cooperate to hermetically seal the enclosed components, but there may be applications in which the hermetic seal is not significant. The lid may be used to secure an optical fiber (not shown) in position. The lid is transparent to the wavelength of the light source (e.g., a silicon substrate for wavelengths of 1 μm and greater), so as to allow light to pass through the lid.

The lens 34 may be used to focus or collimate the beam that is generated by the laser 28 and reflected by the mirror 30. For example, the beam may be focused onto an optical fiber.

Figure 1:
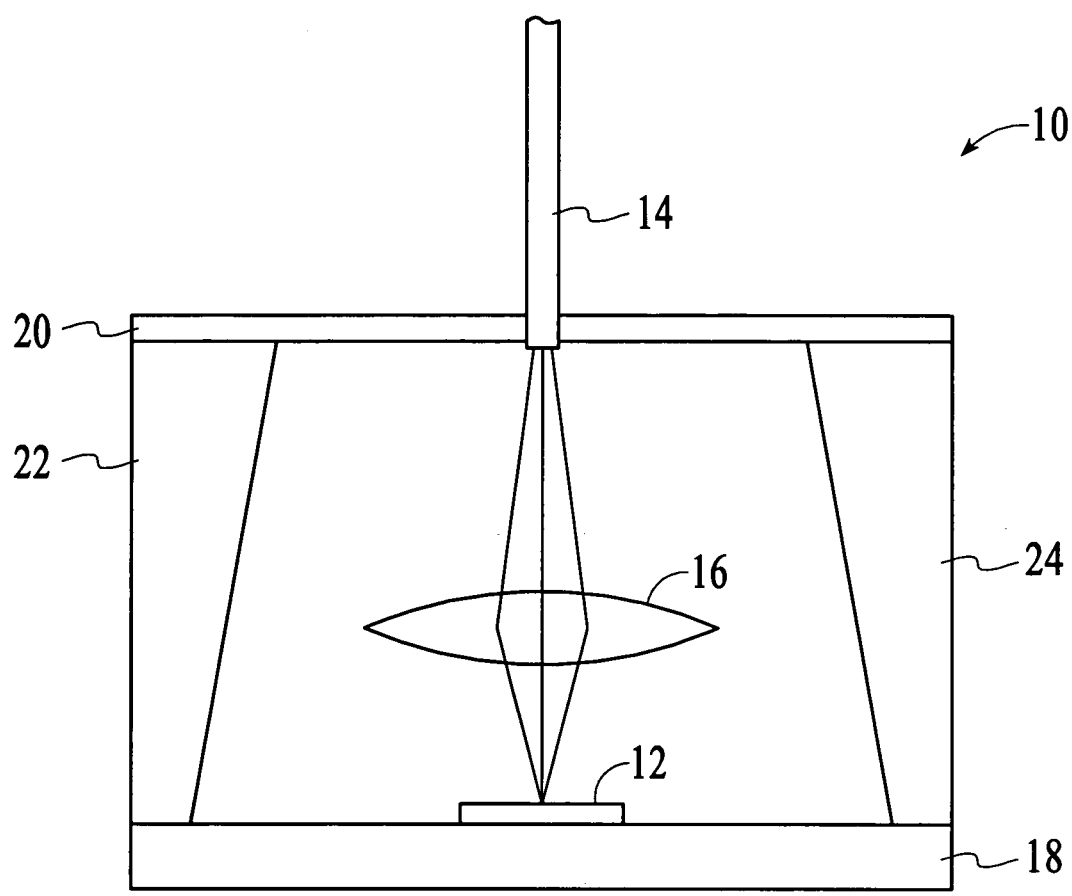
FIG. 1 is a side view of an optics module in which the present invention may be incorporated and practiced.

As was described with reference to FIG. 1, alignment variations will occur from one optics module to the next optics module, even when the different fabrication and assembly operations are performed with exacting tolerances. In at least some of the optics modules, less than maximum coupling efficiency from the laser 28 to an optical fiber or other element will be available unless some alignment adjustment is possible. In FIG. 2, a MicroElectroMechanical System (MEMS) aligner enables alignment adjustment.

Merely as an example of one application of the invention, the lens 34 may be a 230 μm by 230 μm singlet that provides focusing. In another application, the singlet may be replaced with an array of lenses, such as a 1×4 array with a combined dimension of 230 μm by 980 μm. The desired lateral translation within a plane represented by line 42 should be at least 5 μm in any direction from center. In the orientation shown in FIG. 2, the alignment is in both the X and Y axes. The resolution of motion is preferably less than 0.5 μm. The range of motion and the resolution will vary depending upon the application. Moreover, the movement in one axis (e.g., the X axis) from a relaxed "start" position may be restricted to a single direction. That is, as viewed in FIG. 2, the motion of the lens 34 may begin from a position closer to the support 38, with any induced displacement being in the direction of the support 40.

Since the target alignment of the lens 34 will remain constant, the alignment assembly preferably includes a locking mechanism that disables the lens displacement capability after an alignment procedure. Thus, the lens is permanently fixed after alignment is achieved.

In the optics module 26 of FIG. 2, the lens 34 is connected to an alignment assembly that is comprised of an alignment stage ("mover") 44, suspension members 46, 48, 50 and 52, and a locking mechanism that includes a pair of heaters 54 and 56 for heating meltable material 58 and 60. As will be explained more fully below, the suspension members may be flexible supports that are flexed in response to actuator signals. The alignment assembly is an integrated assembly formed by patterned layers on a substrate. Thus, the lid 36 may be a silicon substrate. Conductive vias 62 and 64 provide a means for allowing the actuator signals to be conducted through the lid. The connectivity between the vias and electrical components of the alignment assembly is not shown in FIG. 2.

The alignment assembly may include thermal actuation. Possible thermal actuators include bi-metallic, phase-change, and conventional thermal expansion actuators. However, other types of actuators may be substituted. For example, electrostatic actuators of the type described in U.S. Pat. No. 6,541,829 to Hoen may be employed.

Figure 3:
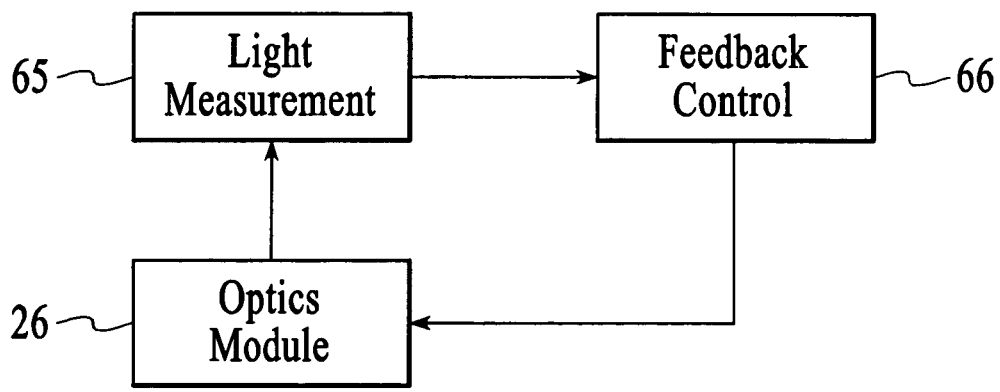
FIG. 3 is a block diagram of components for providing the one-time alignment for the optics module of FIG. 2.

Referring now to FIGS. 2 and 3, during an alignment procedure, the optics module 26 may be connected to a light measurement device 65 which measures the intensity of light received from the module. As the lens 34 within the module is shifted along the X and Y axes, the intensity will vary. The output of the light measurement device is an input for a feedback control module 66. The feedback control module may include computer software that is specifically designed to control the operations of the one-time alignment procedure. Thus, the software may manipulate the position of the lens 34 until the location that provides the maximum coupling efficiency is identified. With the lens in this location, the heaters 54 and 56 are activated, causing the material 58 and 60 to melt. The alignment stage 44 is drawn into contact with the melted material and the material is allowed to cool. As one possibility, electrostatic force may be used to draw the alignment stage in the Z axis following the alignment procedure. An advantage of the use of electrostatic force is that the stage can be "snapped" into contact with the meltable material 58 and 60, since the applied force increases as distance is decreased. To promote wetting of the solder material to the stage of the alignment stage, a gold coating 68 may be added to the bottom surface of the stage. When the meltable material 58 and 60 is cooled, the alignment assembly is locked into a fixed position.

As another possible feature of the locking mechanism, one or more of the suspension members 46–52 may be intentionally disabled after the alignment operation is completed, such that any applied actuator forces will no longer be able to move the alignment stage.

While the meltable material 58 and 60 is shown as being positioned to contact the alignment stage, the "lock-down" contact may be with one or more of the suspension members 46–52. As another possible modification, the lens 34 may be integrally formed with a number of the other components, rather than being attached to the alignment stage 44.

Figure 4:
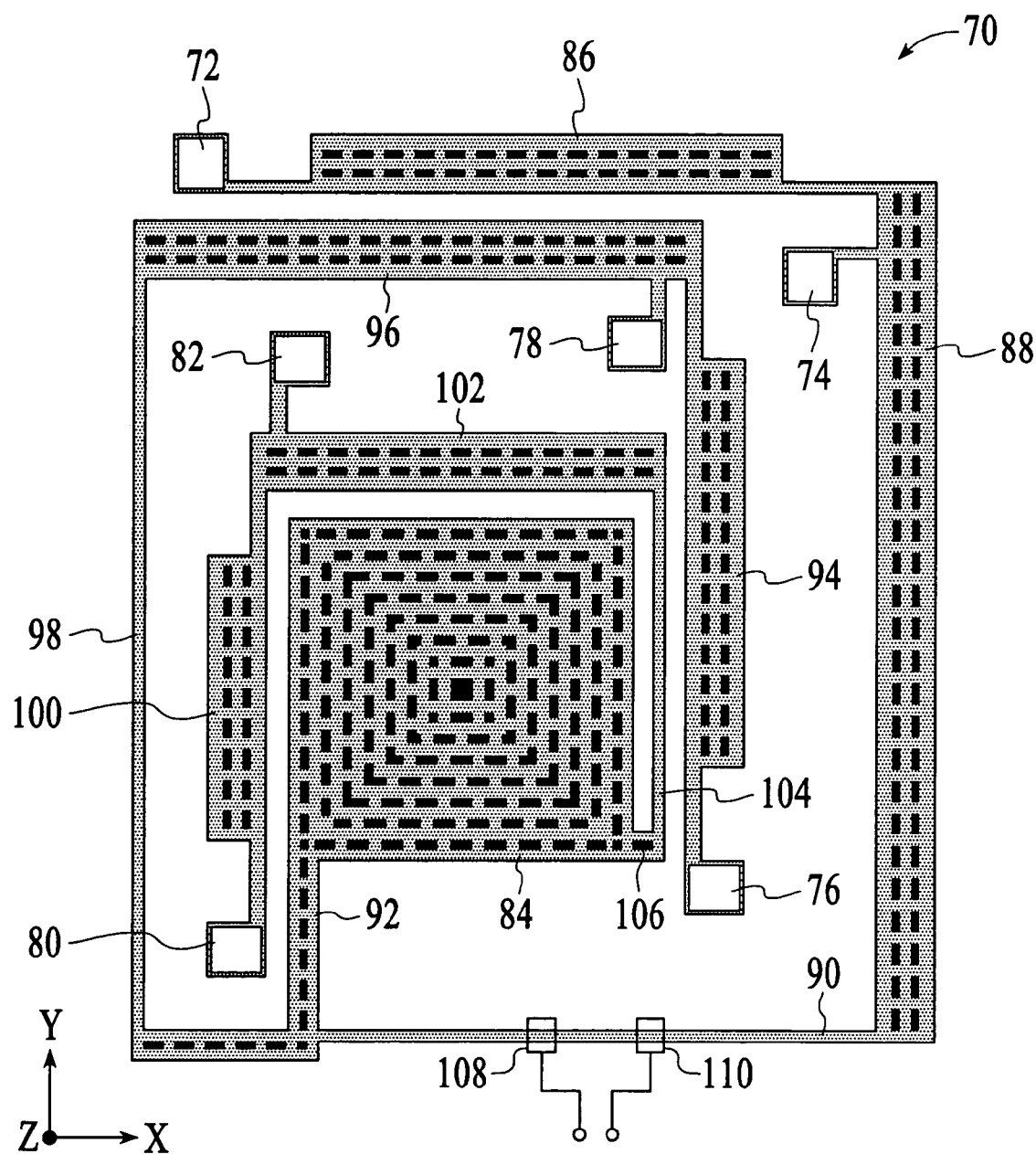
FIG. 4 is a top view of one possible embodiment of an alignment stage for use in FIG. 2.

Referring now to FIG. 4, one possible embodiment of an actuator 70 for supporting and moving either a lens or a light source is shown as an asymmetric thermal actuator. In this design, the asymmetry is a result of having two actuators that control motion in the Y axis and only one actuator that controls movement in the X axis. The actuators are "plated up" structures. The major portion of the structure is suspended above the substrate, since only six anchors 72, 74, 76, 78, 80 and 82 contact the substrate on which the structure is formed.

In order to induce movement of the alignment stage 84 in the X axis, heat may be applied to an expandable leg 86. As the leg expands, the upper end of a "displacement amplifier" 88 is pressed to the right, as viewed in FIG. 4. Since the end of the expandable leg connected to anchor 22 is stationary and the opposite end is connected to the displacement amplifier, force will be applied to the displacement amplifier upon expansion of the leg 86, causing the lower end of the displacement amplifier to rotate to the left (slightly clockwise), as viewed in FIG. 4. This rotation causes a flexure 90 to press a leg 92 of the alignment stage so as to move the stage generally along the X axis. The element 88 may be referred to as a "displacement amplifier," since the attachment to the anchor 74 forms a lever system having an upper "short arm" and lower "long arm." The length of the displacement amplifier and the location of the anchor 74 significantly affect the available motion.

Movement of the alignment stage 84 along the Y axis may be induced by activating either or both of the other two actuators. For one actuator, the expandable leg 94 is heated. Because the expandable leg is attached to an anchor 76 at one end, the expansion of the leg will cause a displacement amplifier 96 to pivot in a counterclockwise rotation, resulting in a flexure 98 being pushed downward. The downward movement of the flexure is translated to the alignment stage 84. Similarly, heating an expandable leg 100 will cause the leg to expand in a direction opposite to its anchor 80, thereby rotating a displacement amplifier 102 and applying a downward force to a flexure 104.

With reference to FIGS. 2 and 4, the meltable material 58 and 60 that secures the alignment stage 44 of FIG. 2 may be located anywhere within the area of the alignment stage 84 of FIG. 4, as long as there is no interference with the lens or light source mounted to the alignment stage. Alternatively, the meltable material may be secured to another location that locks the alignment stage in position after the alignment procedure has been completed. For example, the meltable material may be secured to the legs 92 and 106 that extend from the alignment stage.

As previously mentioned, the locking mechanism may include structure for permanently disabling the ability of the alignment stage 84 to be moved after the alignment procedure has been completed. In FIG. 4, the flexure 90 may be electrically and mechanically "opened" by applying excessive current across to contacts 108 and 110. That is, the flexure may be broken in the same manner as a fuse. In order to eliminate any restriction the contacts may have on the bending of the flexure 90 during the start of the alignment procedure, the contacts may be spaced apart from the flexure until the flexure is to be disabled. Thus, in an application in which the alignment stage 84 is to be drawn to the meltable material using electrostatic force, the electrostatic force may be applied in drawing the flexure to the contacts 108 and 110. A similar arrangement may be used for the flexures 98 and 104. As another possible modification, the electrodes for "fusing" the link can be provided at one side by an anchor and at the other side by a solder connection, which may be joined to a contact pad on the perimeter of the substrate (e.g., semiconductor chip).

Figure 5:
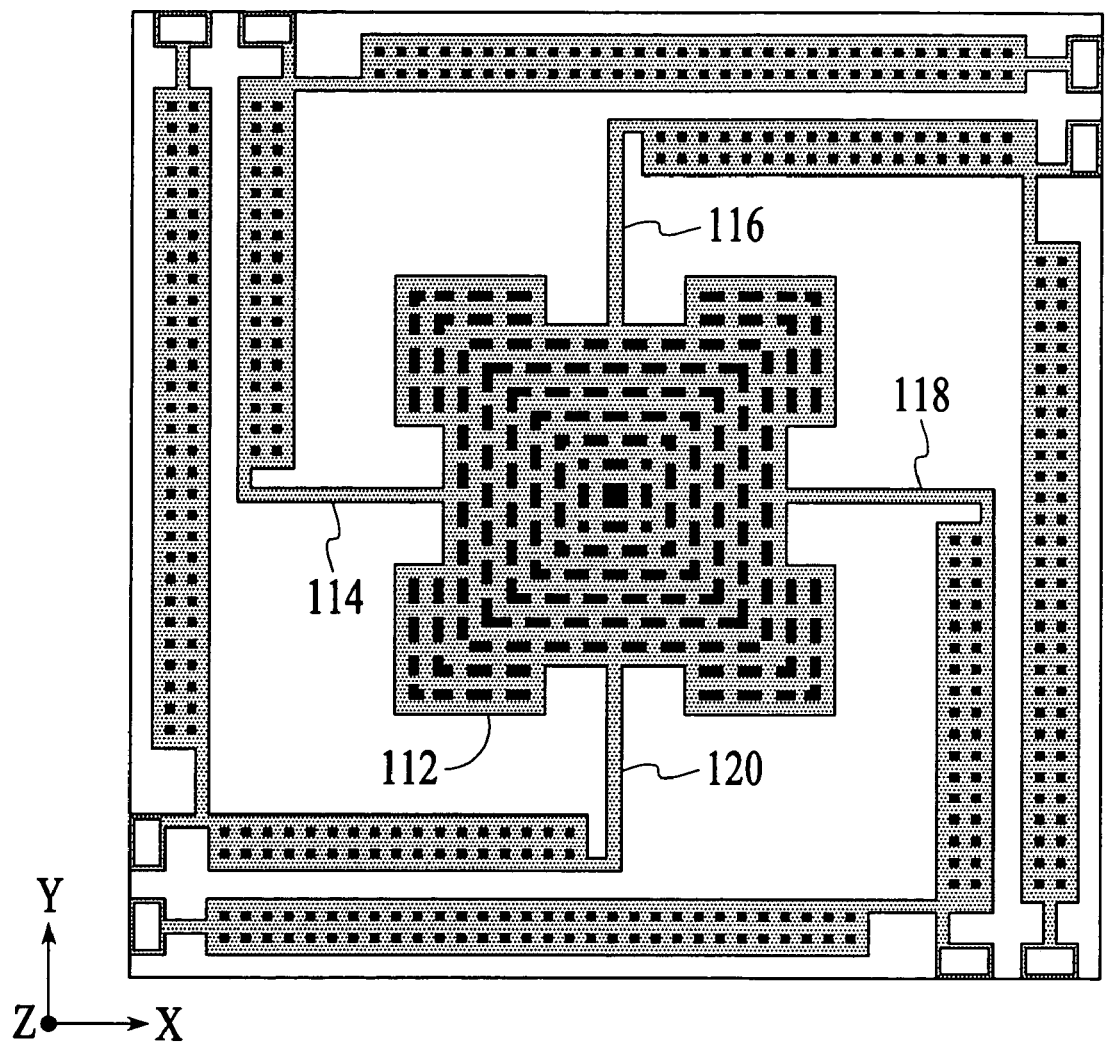
FIG. 5 is a top view of a second possible embodiment of an alignment stage for use in FIG. 2.

In the embodiment of FIG. 4, the alignment stage 84 has a relaxed "start" condition in which it resides at one end of its possible movements in both the X and Y axes. On the other hand, in the embodiment of FIG. 5, the alignment stage is centered within its range of motion when the actuators are deactivated. The thermal actuator includes four actuators that individually function in a manner similar to the three actuators described with reference to FIG. 4. Each of the four actuators in FIG. 5 is coupled to the alignment stage by one of four flexures 114, 116, 118 and 120. Activation of one of the actuators will cause the corresponding flexure to pull the alignment stage 112 from the rest position of FIG. 5. Therefore, the alignment stage can be pulled in any one of the four directions or can be pulled at an angle by activating adjacent actuators.

While the alignment stage has been described and illustrated as being manipulated using thermal actuators, other MEMS actuators may be utilized to manipulate the lateral position of the beam relative to a lens and/or a light source. Where thermal actuation is employed, the force for drawing the structure into contact with the meltable material 58 and 60 of FIG. 2 can be electrostatic force, as will be described below.

Figure 6:
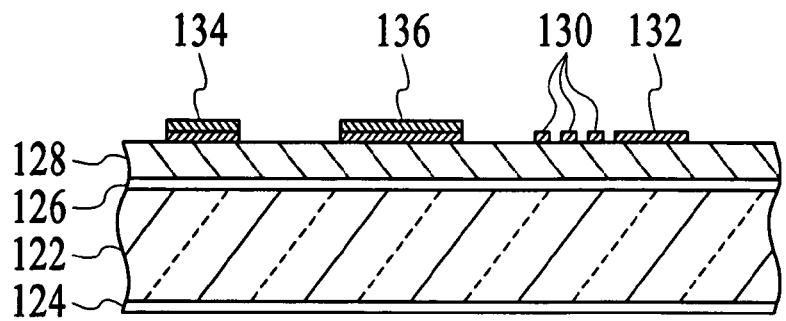
FIGS. 6–11 are side sectional views of the sequence of steps for fabricating components of an optics module in accordance with the invention.

FIGS. 6–11 illustrate one possible process flow of steps for providing a plated nickel actuator with a locking mechanism in accordance with the invention. However, other sequences of steps may be substituted. In FIG. 6, a semiconductor substrate is provided with an antireflection coating and a pair of patterned metal layers. The antireflection coating is significant when the beam from the light source must pass through the substrate. Low Pressure Chemical Vapor Deposition (LPCVD) may be used to form thin silicon nitride layers 124 and 126 on opposite sides of the semiconductor substrate 122. Then, Plasma Enhanced CVD (PECVD) is employed to provide an oxide layer 128. The two metal layers are formed using evaporation processing. The first metal layer may be nickel chromium, while the second metal layer may be aluminum. In FIG. 6, the first layer provides a series of resistors 130 and a single electrode 132. Referring briefly to FIG. 2, the resistors are equivalent to one of the heaters 54 or 56 that heat the meltable material 58 and 60. The electrode 132 is used to provide the electrostatic force for drawing the alignment stage 44 into contact with the meltable material. The aluminum atop the nickel chromium forms a pair of conductive pads 134 and 136.

Figure 7:
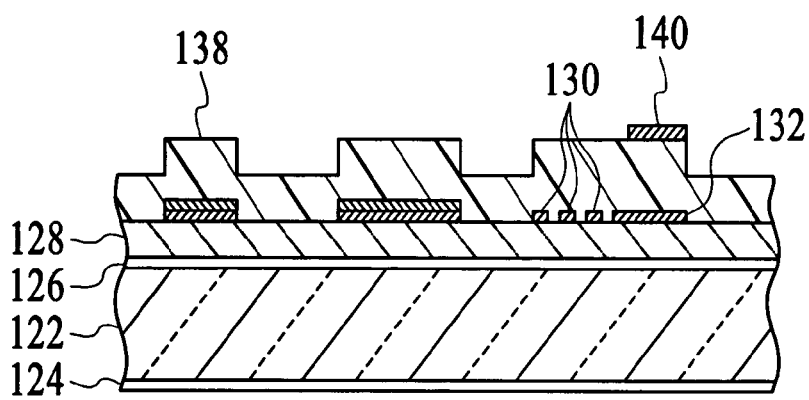

In FIG. 7, PECVD techniques are used to form a nitride layer 138. The meltable material 140 is then formed so as to be in thermal-transfer engagement with the resistors 130 and to be positioned such that electrostatic forces upon the alignment stage as a result of current through the electrode 132 will bring the alignment stage into contact with the meltable material. As one possibility, the fabrication of the meltable material may be a succession of films. The first layer that is deposited upon the nitride layer 138 may be a material, such as titanium, which is selected for its adhesion characteristics to the nitride. The next layer may be a barrier layer, such as platinum. The remaining layers should be selected to provide the desired melting and lock-down capabilities. A gold/tin alloy has an acceptable melting temperature of approximately 280° C.

The fabrication techniques for depositing and patterning the metal layers that form the meltable material 140 are known to persons skilled in the art.

Figure 8:
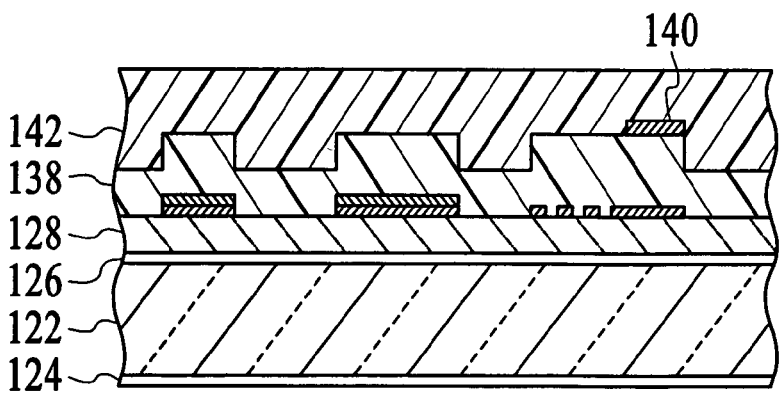

In FIG. 8, a sacrificial layer 142 is blanket deposited and polished. The sacrificial layer may be a photo-resist, but an oxide may be used. PECVD techniques may be employed. The thickness of the sacrificial layer should be less than approximately 5 µm, while the thickness of the meltable material 140 is preferably less than 3 µm and is most preferably approximately 1.5 µm. The two thicknesses are significant, since they determine the distance that must be traveled when the alignment stage is drawn into the meltable material following an alignment operation.

Figure 9:
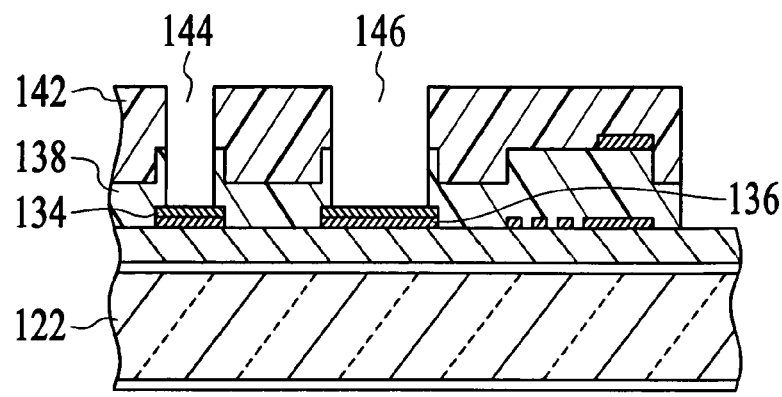

Referring now to FIG. 9, the nitride layer 138 and the sacrificial layer 142 are patterned to form a via 144 and a window 146. The via 144 extends to the pad 134. Subsequently, the portion of the via that extends through the nitride layer 138 is filled with a conductive material In order to provide an input for receiving signals, such as actuator signals. The window 146 is used to define an anchor for an actuator, such as one of the anchors 72, 74, 76, 78, 80 or 82 shown in FIG. 4.

Figure 10:
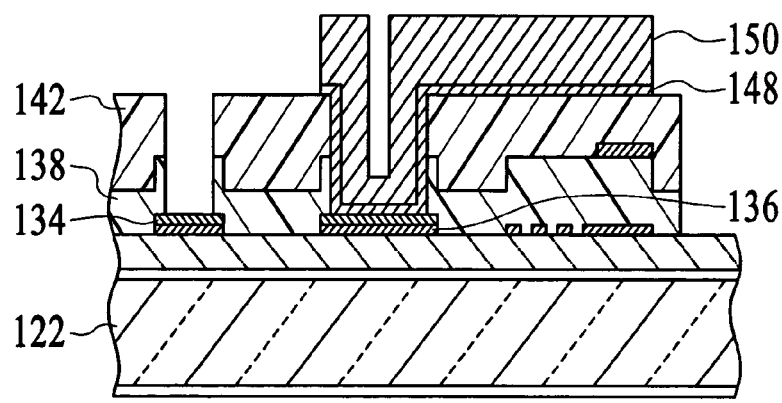

In FIG. 10, a seed layer 148 is deposited and a nickel layer is plated and patterned to form an actuator 150. The actuator is anchored to the pad 136. The seed layer may be comprised of more than one material. For example, an upper layer of gold may be deposited upon a lower layer of chromium. Again merely as example, the seed layer may have a thickness of approximately 2000 Å, while the thickness of the nickel layer that forms the actuator 150 may be 10 µm. Conventional resist strip and etching techniques may be used in patterning the seed layer and the nickel plating.

Figure 11:
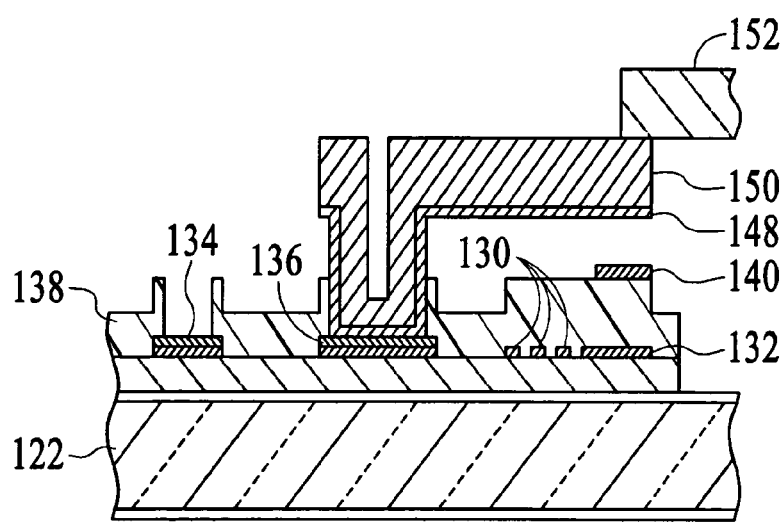

In FIG. 11, the sacrificial layer has been etched and a lens 152 has been attached to the actuator 150. Where the seed layer 148 is formed of separate films of chromium and gold, the chromium also may be etched, leaving a gold coating on the underside of the actuator 150.

Thermal actuation is achieved by passing an electric current through the actuator 150. The connection to the bonding pad 136 functions both as an anchor and as a means for conducting current through the actuator. Referring to FIG. 4, thermal actuation is provided by conducting current through an anchor, such as the anchor 72, so that the expandable leg 86 is caused to lengthen. As previously described, the lengthening presses the short arm of the lever system defined by the displacement amplifier 88 and by its anchor 74 to the substrate. The long arm of the lever system is connected to the flexure 90, which is coupled to the alignment stage 84 by means of the leg 92. Any expansion or contraction of the expandable leg 86 is therefore translated to the alignment stage.

Returning to FIG. 11, after the alignment stage has been properly positioned, the electrode 132 is used to generate electrostatic forces on the actuator 150, drawing the cantilevered end of the actuator into contact with the meltable material 140. Some of the heat generated by conducting current through the resistors 130 will conduct through the nitride layer 138 to melt the material 140. With the lens 152 properly aligned and the gold coating 148 in contact with the melted material 140, the current through the resistors 130 is terminated. This allows the meltable material to cool, locking the actuator in position.

Rather than allowing a lens to move relative to a stationary beam, the beam may be moved relative to a stationary lens. For example, the light source (e.g., VCSEL) may be fabricated directly onto an alignment stage. As another possibility, both the lens and the light source may be fixed in position, but a mirror is shifted in position until coupling efficiency is maximized and the ability to move the mirror is permanently disabled.

A similar approach may be applied to fabricating silicon actuators. For the process flow, silicon actuators can be constructed using either known surface micro-machine processes or known bulk micro-machine processes. Furthermore, diffractive optical elements can be incorporated into the process flow.

The surface micro-machine process steps are similar to those described above with reference to forming a nickel actuator. However, polysilicon may be used in place of the nickel. Rather than depositing polysilicon in a mold, the material may be blanket deposited and then etched into its final shape. Moreover, the resistors (heaters) can be integrated in the polysilicon processing.

Fabricating the bulk micro-machined actuator may be a two-wafer process. Fabricated on the first wafer are components such as the heating means, the electrodes which are used for generating the electrostatic force that draws the actuator, and the meltable material (e.g., gold tin). The second wafer may incorporate the actuator, the components for driving the actuator (e.g., heating capability for thermal actuators), contacts for wafer scale bonding, and contacts for the locking mechanism that is used to secure the actuator following the one-time alignment process.

Figure 12:
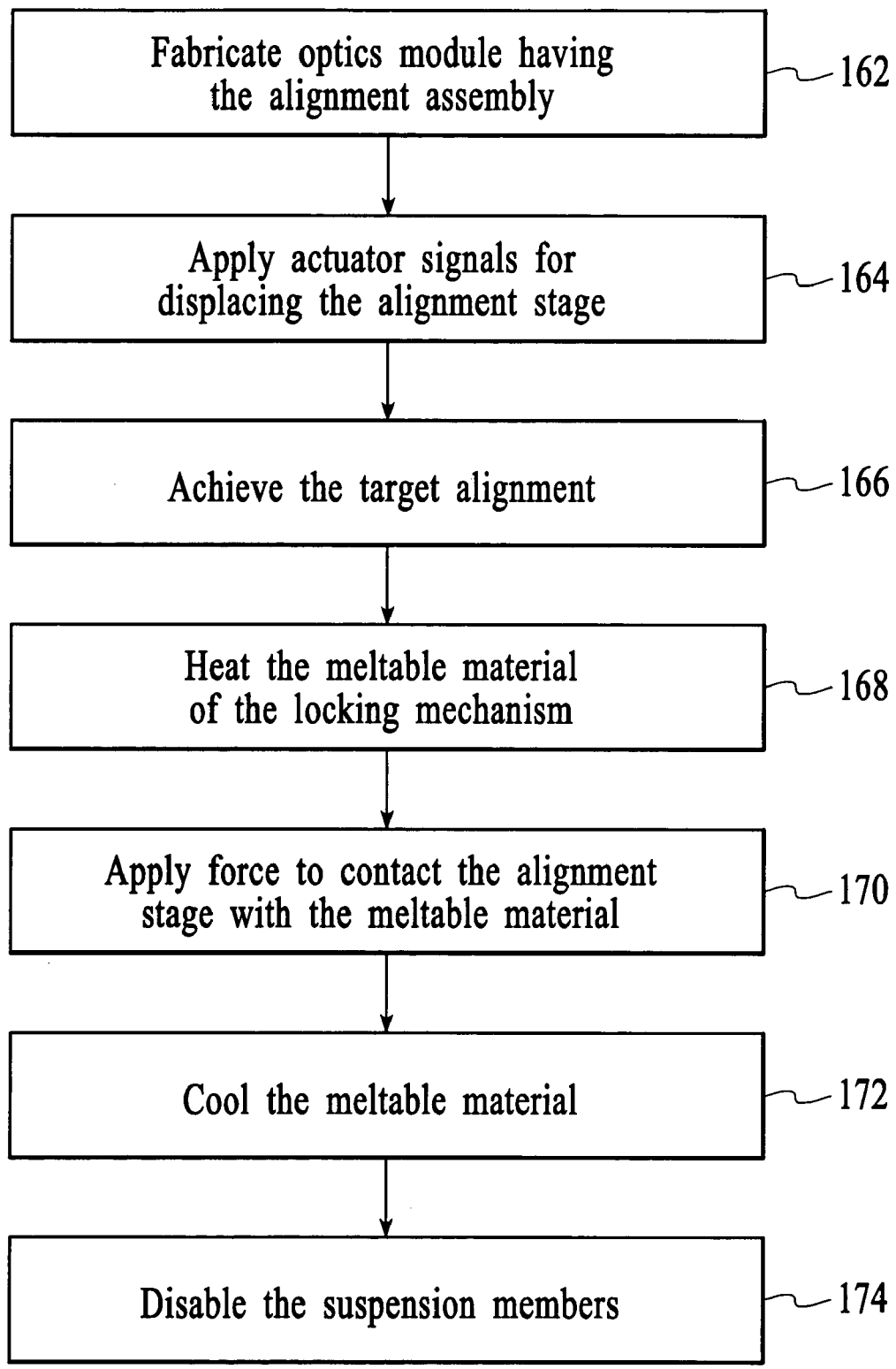
FIG. 12 is a process flow of steps for providing alignment within the optics module.

Referring finally to FIG. 12, after the optics module having the alignment assembly is fabricated at step 162, the alignment procedure may begin. Thus, at step 164, the actuator signals are applied for displacing the alignment stage. As previously noted, the initial displacement of the alignment stage is primarily lateral, but there may be a degree of movement along the "Z axis." Typically, the lateral shift is possible in perpendicular directions (along X and Y axes). However, there may be some applications in which movement along only one axis is required. Thermal actuators provide advantages in the lateral displacement of the alignment stage.

The alignment stage is manipulated until the target alignment is achieved at step 166. A light measurement device may be positioned to monitor the intensity of light received from the optics module, so that the position of maximum intensity may be detected. Manual or automated techniques or a combination of manual and automated techniques may be employed.

At steps 168 and 170, the meltable material of the locking mechanism is heated and the force is applied for contacting the alignment stage with the melted material. The position of the step 168 of melting the material is not critical. For example, the heaters which are utilized may be activated prior to or during the step 164 of applying the actuator signals. Alternatively, the positions of steps 168 and 170 may be reversed without diverging from the invention. In one embodiment, the applied force at step 170 is electrostatically induced. An advantage of electrostatic force in manipulating the position of the alignment stage along the Z axis is that a high force in the Z direction can be achieved, as this force increases with decreasing distance.

The meltable material is then cooled at step 172. This locks the alignment stage in position. As previously noted, the lock-down contact is intended to finalize a one-time alignment procedure. Thus, as an optional step, one or more suspension members may be disabled at step 174, so that the alignment stage is no longer able to move. The alignment procedure of steps 164–174 may be executed by a manufacturer or may be provided by the end-user of the optics module, with or without the aid of automated alignment software which is furnished with the optics module to the end-user.

What is claimed is:

1. An alignment assembly enclosed within an optics module having a light source and a lens comprising:
    an alignment stage coupled to enable adjustment of a relative position of said light source and said lens, said alignment stage being supported by thermally actuated members such that thermal actuation provides said adjustment of said relative position of said light source and said lens, said alignment stage being manipulable from an exterior of said optics module;
    a meltable material positioned within said optics module to lock said alignment stage in a fixed location when a target said relative position of said light source and lens is achieved; and
    a heat source in heat-transfer engagement with said meltable material to selectively melt said meltable material.

2. The alignment assembly of claim 1 wherein said alignment stage is responsive to first applied displacement forces which induce lateral movements of said alignment stage in achieving said target relative position of said light source and said lens, said alignment stage being responsive to second applied displacement forces which induce said alignment stage to contact said meltable material when said target relative position is achieved.

3. The alignment assembly of claim 2 wherein said second applied displacement forces are electrostatic forces applied to said alignment stage to induce displacement in a direction that is generally perpendicular to said lateral movements induced by said first applied displacement forces.

4. The alignment assembly of claim 2 wherein said alignment stage includes a metallic plating that is located such that said metallic plating contacts said meltable material when said second applied displacement forces are generated, said meltable material being a solder.

5. The alignment assembly of claim 4 wherein said solder is a gold/tin alloy.

6. The alignment assembly of claim 1 wherein said alignment stage, said meltable material and said heat source are integrated components defined by a plurality of layers on a substrate.

7. The alignment assembly of claim 6 wherein said substrate is a semiconductor substrate and at least some of said layers have thicknesses of less than 30 micrometers.

8. The alignment assembly of claim 1 wherein said alignment stage is responsive to electrostatic force to selectively displace said alignment stage to contact said meltable material when said target relative position is achieved.

9. An optics module comprising:
an enclosure;
a light source within said enclosure;
a lens positioned within said enclosure to optically manipulate a beam generated by said light source;
an alignment assembly enabled to vary the relative positioning between said lens and an axis of said beam, said alignment assembly being located within said enclosure, said alignment assembly including support members which are flexible to provide said varying relative positioning in a direction generally perpendicular to said axis, said alignment assembly being responsive to actuator forces to flex said support members;
a locking mechanism which disables said alignment assembly to provide a fixed said relative positioning in which said alignment assembly is unresponsive to said actuator forces, said locking mechanism includes (a) a heater, (b) solder, and (c) a source of electrostatic force, said support members of said alignment assembly having a cantilevered portion responsive to said electrostatic force to move in a direction generally aligned with said axis of said beam so as to being said cantilevered portion into contact with said solder, said heater being located and activated to selectively melt said solder; and
input/output connections at an exterior of said enclosure for operating said alignment assembly and said locking mechanism.

10. The optics module of claim 9 wherein one of said light source and said lens is fixed to said alignment assembly.

11. The optics module of claim 9 wherein said locking mechanism includes a connection for permanently fixing at least one of said support members in position after a target condition of said relative positioning is achieved.

12. The optics module of claim 9 wherein said support members are thermal actuators that vary said relative positioning in response to applications of heat.

13. The optics module of claim 9 wherein said alignment assembly and said heat source are defined by layers deposited on a semiconductor substrate.

14. A method of forming an alignment assembly for an optics module comprising:
forming a plurality of patterned layers on at least one substrate so as to define a cooperative assembly of:
(a) an alignment stage coupled to enable adjustment of a relative position of a light source and a lens, said alignment stage being configured to support one of said light source and said lens;
(b) meltable material positioned to lock said alignment stage in a fixed location when a target said relative position of said light source and said lens is achieved;
(c) a heat source in heat-transfer engagement with said meltable material to selectively melt said meltable material; and
(d) at least one thermal actuator that is manipulated by applications of thermal actuator signals to provide said adjustments to said relative position of said light source and said lens.

15. The method of claim 14 wherein forming said patterned layers includes defining said meltable material as a solder.

16. The method of claim 15 wherein defining said meltable material includes depositing a gold/tin alloy.

17. The method of claim 14 wherein fabricating said actuator includes forming said central region supported by flexible members.

18. A method of providing optical alignment within an optics module comprising:
applying actuator signals to laterally displace an alignment stage which controls the relative lateral position of a beam axis to a lens, including controlling said actuator signals to provide a target said relative lateral position;
detecting when said target relative lateral position is achieved;
shifting said alignment stage in a direction generally parallel to said beam axis to contact said alignment stage with a meltable material, including melting said meltable material;
cooling said meltable material to fix said alignment stage in a position to maintain said target relative lateral position; and
providing a fusible structure which permanently disables lateral movement of said alignment stage following said cooling step, said permanent disabling of said lateral movement occurring when said fusible structure is opened.

19. The method of claim 18 wherein applying said actuator signals is a step of manipulating thermal actuators that support said alignment stage.

20. The method of claim 18 wherein melting said meltable material is a step of applying heat to a gold/tin alloy.

* * * * *

UNITED STATES PATENT AND TRADEMARK OFFICE
CERTIFICATE OF CORRECTION

| | | |
|---|---|---|
| PATENT NO. | : 7,027,694 B2 | Page 1 of 1 |
| APPLICATION NO. | : 10/718207 | |
| DATED | : April 11, 2006 | |
| INVENTOR(S) | : Tak Wang | |

It is certified that error appears in the above-identified patent and that said Letters Patent is hereby corrected as shown below:

Col. 9 Line 26 In Claim 9, delete "being" and insert -- bring --, therefor.

Signed and Sealed this

Seventeenth Day of February, 2009

JOHN DOLL
*Acting Director of the United States Patent and Trademark Office*